United States Patent
Thomson (10) Patent No.: US 9,958,873 B2
(45) Date of Patent: May 1, 2018

(54) SYSTEM FOR EFFICIENT SCHEDULING FOR MULTIPLE AUTOMATED NON-HOLONOMIC VEHICLES USING A COORDINATED PATH PLANNER

(71) Applicant: Crown Equipment Limited, East Tamaki, Auckland (NZ)

(72) Inventor: Jacob Jay Thomson, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days. days.

(21) Appl. No.: 14/881,511

(22) Filed: Oct. 13, 2015

(65) Prior Publication Data

US 2016/0033971 A1 Feb. 4, 2016

Related U.S. Application Data

(63) Continuation of application No. 14/110,950, filed as application No. PCT/NZ2012/000051 on Apr. 10, 2012, now Pat. No. 9,188,982.
(Continued)

(51) Int. Cl.
*G01C 21/20* (2006.01)
*G05D 1/02* (2006.01)

(52) U.S. Cl.
CPC .......... *G05D 1/0297* (2013.01); *G01C 21/206* (2013.01); *G05D 1/0212* (2013.01);
(Continued)

(58) Field of Classification Search
CPC ............................ G05D 1/0297; G01C 21/206
See application file for complete search history.

(56) References Cited

U.S. PATENT DOCUMENTS

| 4,043,418 A | 8/1977 | Blakeslee |
| 4,071,740 A | 1/1978 | Gogulski |

(Continued)

FOREIGN PATENT DOCUMENTS

| CN | 101162154 A | 4/2008 |
| CN | 101520946 A | 9/2009 |

(Continued)

OTHER PUBLICATIONS

Chao Yong and Eric J. Barth—Real-Time Dynamic Path Planning for Dubins Nonholonomic Robot—Published Dec. 13-15, 2006. Accessed from: http://ieeexplore.ieee.org/xpl/articleDetails.jsp?arnumber=4177899 on Sep. 17, 2014.*

(Continued)

*Primary Examiner* — Jess Whittington
(74) *Attorney, Agent, or Firm* — Dinsmore & Shohl LLP (57) ABSTRACT

A method for coordinating path planning for one or more automated vehicles is described, including querying an online path planner for possible solutions for at least one executable task for each of the one or more automated vehicles, examining the results of the query, deciding a coordinated path plan for each vehicle, and communicating the coordinated path plan to a traffic manager, wherein the traffic manager ensures that the one or more automated vehicles perform each executable task according to the coordinated path plan.

19 Claims, 4 Drawing Sheets

Related U.S. Application Data (60) Provisional application No. 61/474,030, filed on Apr. 11, 2011.

(52) U.S. Cl.
CPC ......... *G05D 1/0274* (2013.01); *G05D 1/0289* (2013.01); *G05D 1/0291* (2013.01); *G05D 2201/0216* (2013.01)

(56) References Cited

U.S. PATENT DOCUMENTS

| | | | |
|---|---|---|---|
| 4,483,407 A | 11/1984 | Iwamoto et al. | |
| 4,530,056 A | 7/1985 | MacKinnon et al. | |
| 4,674,048 A | 6/1987 | Okumura et al. | |
| 4,746,977 A | 5/1988 | White | |
| 4,750,123 A | 6/1988 | Christian | |
| 4,782,920 A | 11/1988 | Gaibler et al. | |
| 4,800,977 A | 1/1989 | Boegli et al. | |
| 4,816,988 A | 3/1989 | Yamanaka | |
| 4,816,998 A | 3/1989 | Ahlbom | |
| 4,847,769 A | 7/1989 | Reeve | |
| 4,855,915 A | 8/1989 | Dallaire | |
| 4,858,132 A | 8/1989 | Holmquist | |
| 4,875,172 A | 10/1989 | Kanayama | |
| 4,944,357 A | 7/1990 | Wible et al. | |
| 4,996,468 A | 2/1991 | Field et al. | |
| 5,011,358 A | 4/1991 | Andersen et al. | |
| 5,051,906 A | 9/1991 | Evans, Jr. et al. | |
| 5,170,352 A | 12/1992 | McTamaney et al. | |
| 5,175,480 A | 12/1992 | McKeefery et al. | |
| 5,202,832 A | 4/1993 | Lisy | |
| 5,208,753 A | 5/1993 | Acuff | |
| 5,274,560 A * | 12/1993 | LaRue ............... | G01C 21/3629 340/988 |
| 5,276,618 A | 1/1994 | Everett, Jr. | |
| 5,283,739 A | 2/1994 | Summerville et al. | |
| 5,315,517 A | 5/1994 | Kawase et al. | |
| 5,324,948 A | 6/1994 | Dudar et al. | |
| 5,350,033 A | 9/1994 | Kraft | |
| 5,367,458 A | 11/1994 | Roberts et al. | |
| 5,402,344 A | 3/1995 | Reister et al. | |
| 5,446,356 A | 8/1995 | Kim | |
| 5,461,292 A | 10/1995 | Zondlo et al. | |
| 5,471,393 A | 11/1995 | Bolger | |
| 5,487,009 A | 1/1996 | Hill et al. | |
| 5,488,277 A | 1/1996 | Nishikawa et al. | |
| 5,491,670 A | 2/1996 | Weber | |
| 5,515,934 A | 5/1996 | Davis | |
| 5,535,843 A | 7/1996 | Takeda et al. | |
| 5,539,638 A | 7/1996 | Keeler et al. | |
| 5,545,960 A | 8/1996 | Ishikawa | |
| 5,548,511 A | 8/1996 | Bancroft | |
| 5,548,512 A | 8/1996 | Quraishi | |
| 5,559,696 A | 9/1996 | Borenstein | |
| 5,568,030 A | 10/1996 | Nishikawa et al. | |
| 5,586,620 A | 12/1996 | Dammeyer et al. | |
| 5,612,883 A | 3/1997 | Shaffer et al. | |
| 5,652,489 A | 7/1997 | Kawakami | |
| 5,680,306 A | 10/1997 | Shin et al. | |
| 5,682,317 A | 10/1997 | Keeler et al. | |
| 5,684,696 A | 11/1997 | Rao et al. | |
| 5,687,294 A | 11/1997 | Jeong | |
| 5,709,007 A | 1/1998 | Chiang | |
| 5,739,657 A | 4/1998 | Takayama et al. | |
| 5,764,014 A | 6/1998 | Jakeway et al. | |
| 5,819,008 A | 10/1998 | Asama et al. | |
| 5,819,863 A | 10/1998 | Zollinger et al. | |
| 5,867,800 A | 2/1999 | Leif | |
| 5,908,466 A | 6/1999 | Veugen et al. | |
| 5,911,767 A | 6/1999 | Garibotto et al. | |
| 5,916,285 A | 6/1999 | Alofs et al. | |
| 5,938,710 A * | 8/1999 | Lanza ............... | B66F 9/063 180/169 |
| 5,941,935 A | 8/1999 | Fernandez et al. | |
| 5,942,869 A | 8/1999 | Katou et al. | |
| 5,961,571 A | 10/1999 | Gorr et al. | |
| 6,012,003 A | 1/2000 | Astroem | |
| 6,038,501 A | 3/2000 | Kawakami et al. | |
| 6,041,274 A | 3/2000 | Onishi et al. | |
| 6,046,565 A | 4/2000 | Thorne | |
| 6,092,010 A | 7/2000 | Alofs et al. | |
| 6,122,572 A | 9/2000 | Yavnai et al. | |
| 6,208,916 B1 | 3/2001 | Hori | |
| 6,246,930 B1 | 6/2001 | Hori | |
| 6,269,291 B1 | 7/2001 | Segeren | |
| 6,272,405 B1 | 8/2001 | Kubota | |
| 6,285,951 B1 | 9/2001 | Gaskins et al. | |
| 6,295,503 B1 | 9/2001 | Inoue et al. | |
| 6,308,118 B1 | 10/2001 | Holmquist | |
| 6,314,341 B1 | 11/2001 | Kanayama | |
| 6,325,749 B1 | 12/2001 | Inokuchi et al. | |
| 6,338,013 B1 | 1/2002 | Ruffner | |
| 6,360,165 B1 | 3/2002 | Chowdhary | |
| 6,370,453 B2 | 4/2002 | Sommer | |
| 6,374,155 B1 | 4/2002 | Wallach et al. | |
| 6,385,515 B1 | 5/2002 | Dickson et al. | |
| 6,442,476 B1 | 8/2002 | Poropat | |
| 6,445,983 B1 | 9/2002 | Dickson et al. | |
| 6,446,005 B1 | 9/2002 | Bingeman et al. | |
| 6,453,223 B1 | 9/2002 | Kelly et al. | |
| 6,454,036 B1 | 9/2002 | Airey et al. | |
| 6,459,955 B1 | 10/2002 | Bartsch et al. | |
| 6,459,966 B2 | 10/2002 | Nakano et al. | |
| 6,461,355 B2 | 10/2002 | Svejkovsky et al. | |
| 6,470,300 B1 | 10/2002 | Benzinger et al. | |
| 6,493,614 B1 | 12/2002 | Jung | |
| 6,496,755 B2 | 12/2002 | Wallach et al. | |
| 6,502,017 B2 | 12/2002 | Ruffner | |
| 6,539,294 B1 | 3/2003 | Kageyama | |
| 6,580,246 B2 | 6/2003 | Jacobs | |
| 6,584,375 B2 | 6/2003 | Bancroft et al. | |
| 6,592,488 B2 | 7/2003 | Gassmann | |
| 6,629,735 B1 | 10/2003 | Galy | |
| 6,641,355 B1 | 11/2003 | McInerney et al. | |
| 6,667,592 B2 | 12/2003 | Jacobs et al. | |
| 6,816,085 B1 | 11/2004 | Haynes et al. | |
| 6,842,692 B2 | 1/2005 | Fehr et al. | |
| 6,882,910 B2 | 4/2005 | Jeong | |
| 6,917,839 B2 | 7/2005 | Bickford | |
| 6,922,632 B2 | 7/2005 | Foxlin | |
| 6,934,615 B2 | 8/2005 | Flann et al. | |
| 6,946,565 B2 | 9/2005 | Fedouloff et al. | |
| 6,952,488 B2 | 10/2005 | Kelly et al. | |
| 7,015,831 B2 | 3/2006 | Karlsson et al. | |
| 7,076,336 B2 | 7/2006 | Murray, IV et al. | |
| 7,100,725 B2 | 9/2006 | Thorne | |
| 7,147,147 B1 | 12/2006 | Enright et al. | |
| 7,148,458 B2 | 12/2006 | Schell et al. | |
| 7,162,056 B2 | 1/2007 | Burl et al. | |
| 7,162,338 B2 | 1/2007 | Goncalves et al. | |
| 7,177,737 B2 | 2/2007 | Karlsson et al. | |
| 7,246,007 B2 | 7/2007 | Ferman | |
| 7,272,467 B2 | 9/2007 | Goncalves et al. | |
| 7,295,114 B1 | 11/2007 | Drzaic et al. | |
| 7,305,287 B2 | 12/2007 | Park | |
| 7,343,232 B2 | 3/2008 | Duggan et al. | |
| 7,386,163 B2 | 6/2008 | Sabe et al. | |
| 7,451,021 B2 | 11/2008 | Wilson | |
| 7,451,030 B2 | 11/2008 | Eglington et al. | |
| 7,499,796 B2 | 3/2009 | Listle et al. | |
| 7,539,563 B2 | 5/2009 | Yang et al. | |
| 7,610,123 B2 | 10/2009 | Han et al. | |
| 7,646,336 B2 | 1/2010 | Tan et al. | |
| 7,650,231 B2 | 1/2010 | Gadler | |
| 7,676,532 B1 | 3/2010 | Liu et al. | |
| 7,688,225 B1 | 3/2010 | Haynes et al. | |
| 7,689,321 B2 | 3/2010 | Karlsson | |
| 7,720,554 B2 | 5/2010 | DiBernardo et al. | |
| 7,734,385 B2 | 6/2010 | Yang et al. | |
| 7,739,006 B2 | 6/2010 | Gillula | |
| 7,844,364 B2 | 11/2010 | McLurkin et al. | |
| 7,996,097 B2 | 8/2011 | DiBernardo et al. | |
| 8,020,657 B2 | 9/2011 | Allard et al. | |

(56) References Cited

U.S. PATENT DOCUMENTS

| | | |
|---|---|---|
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,271,069 B2 | 9/2012 | Jascob et al. |
| 8,280,623 B2 | 10/2012 | Trepagnier et al. |
| 8,296,065 B2 | 10/2012 | Haynie et al. |
| 8,538,577 B2 | 9/2013 | Bell et al. |
| 2002/0049530 A1 | 4/2002 | Poropat |
| 2002/0095239 A1 | 7/2002 | Wallach et al. |
| 2002/0107632 A1* | 8/2002 | Fuse ................ B60K 6/543 701/112 |
| 2002/0118111 A1 | 8/2002 | Brown et al. |
| 2002/0165638 A1 | 11/2002 | Bancroft et al. |
| 2002/0165790 A1 | 11/2002 | Bancroft et al. |
| 2003/0030398 A1 | 2/2003 | Jacobs et al. |
| 2003/0030399 A1 | 2/2003 | Jacobs |
| 2003/0212472 A1 | 11/2003 | McKee |
| 2003/0236590 A1 | 12/2003 | Park et al. |
| 2004/0002283 A1 | 1/2004 | Herbert et al. |
| 2004/0010337 A1 | 1/2004 | Mountz |
| 2004/0030493 A1 | 2/2004 | Pechatnikov et al. |
| 2004/0073337 A1 | 4/2004 | McKee et al. |
| 2004/0093116 A1 | 5/2004 | Mountz |
| 2004/0093650 A1 | 5/2004 | Martins et al. |
| 2004/0111184 A1 | 6/2004 | Chiappetta et al. |
| 2004/0195012 A1 | 10/2004 | Song et al. |
| 2004/0202351 A1 | 10/2004 | Park et al. |
| 2004/0249504 A1 | 12/2004 | Gutmann |
| 2005/0004702 A1 | 1/2005 | McDonald |
| 2005/0029029 A1 | 2/2005 | Thorne |
| 2005/0075116 A1 | 4/2005 | Laird et al. |
| 2005/0080524 A1* | 4/2005 | Park ................ G05D 1/0289 701/23 |
| 2005/0131645 A1 | 6/2005 | Panopoulos |
| 2005/0140524 A1 | 6/2005 | Kato et al. |
| 2005/0149256 A1 | 7/2005 | Lawitzky et al. |
| 2005/0182518 A1 | 8/2005 | Karlsson |
| 2005/0216126 A1 | 9/2005 | Koselka et al. |
| 2005/0234679 A1 | 10/2005 | Karlsson |
| 2005/0244259 A1 | 11/2005 | Chilson et al. |
| 2005/0246078 A1 | 11/2005 | Vercammen |
| 2005/0246248 A1 | 11/2005 | Vesuna |
| 2006/0012493 A1 | 1/2006 | Karlsson et al. |
| 2006/0053057 A1 | 3/2006 | Michael |
| 2006/0055530 A1 | 3/2006 | Wang et al. |
| 2006/0061476 A1 | 3/2006 | Patil et al. |
| 2006/0095170 A1 | 5/2006 | Yang |
| 2006/0170565 A1 | 8/2006 | Husak et al. |
| 2006/0181391 A1 | 8/2006 | McNeill et al. |
| 2006/0184013 A1 | 8/2006 | Emanuel et al. |
| 2006/0218374 A1 | 9/2006 | Ebert |
| 2006/0267731 A1 | 11/2006 | Chen |
| 2006/0293810 A1 | 12/2006 | Nakamoto |
| 2007/0018811 A1 | 1/2007 | Gollu |
| 2007/0018820 A1 | 1/2007 | Chand et al. |
| 2007/0027612 A1* | 2/2007 | Barfoot ................ G08G 1/20 701/117 |
| 2007/0050088 A1 | 3/2007 | Murray et al. |
| 2007/0061043 A1 | 3/2007 | Ermakov et al. |
| 2007/0090973 A1 | 4/2007 | Karlsson et al. |
| 2007/0106465 A1* | 5/2007 | Adam ................ G01C 21/3492 701/533 |
| 2007/0118286 A1 | 5/2007 | Wang et al. |
| 2007/0150097 A1 | 6/2007 | Chae et al. |
| 2007/0153802 A1 | 7/2007 | Anke et al. |
| 2007/0213869 A1 | 9/2007 | Bandringa et al. |
| 2007/0244640 A1 | 10/2007 | Hirokawa |
| 2007/0262884 A1 | 11/2007 | Goncalves et al. |
| 2008/0015772 A1 | 1/2008 | Sanma et al. |
| 2008/0042839 A1 | 2/2008 | Grater |
| 2008/0046170 A1 | 2/2008 | DeGrazia |
| 2008/0167817 A1 | 7/2008 | Hessler et al. |
| 2008/0183378 A1* | 7/2008 | Weidner ................ G01C 21/20 701/533 |
| 2008/0199298 A1 | 8/2008 | Chilson et al. |
| 2008/0272193 A1 | 11/2008 | Silverbrook et al. |
| 2009/0005986 A1 | 1/2009 | Soehren |
| 2009/0012667 A1 | 1/2009 | Matsumoto et al. |
| 2009/0140887 A1 | 6/2009 | Breed et al. |
| 2009/0198371 A1 | 8/2009 | Emanuel et al. |
| 2009/0210092 A1 | 8/2009 | Park et al. |
| 2009/0216438 A1 | 8/2009 | Shafer |
| 2009/0306946 A1* | 12/2009 | Badler ................ G06N 3/004 703/2 |
| 2010/0021272 A1 | 1/2010 | Ward et al. |
| 2010/0023257 A1 | 1/2010 | MacHino |
| 2010/0161224 A1 | 6/2010 | Lee et al. |
| 2010/0204974 A1 | 8/2010 | Israelsen et al. |
| 2010/0222925 A1 | 9/2010 | Anezaki |
| 2010/0222995 A1* | 9/2010 | Tu ................ G01C 21/3446 701/532 |
| 2010/0256908 A1 | 10/2010 | Shimshoni et al. |
| 2010/0268697 A1 | 10/2010 | Karlsson et al. |
| 2010/0286905 A1 | 11/2010 | Goncalves et al. |
| 2010/0286908 A1* | 11/2010 | Tate, Jr. ............ G01C 21/3469 701/533 |
| 2010/0286909 A1 | 11/2010 | Tate, Jr. et al. |
| 2010/0312386 A1* | 12/2010 | Chrysanthakopoulos ................ G06K 9/6292 700/246 |
| 2011/0010023 A1* | 1/2011 | Kunzig ................ G01S 5/16 701/2 |
| 2011/0060449 A1* | 3/2011 | Wurman ............ G05B 19/4189 700/218 |
| 2011/0085426 A1 | 4/2011 | Kwon et al. |
| 2011/0121068 A1 | 5/2011 | Emanuel et al. |
| 2011/0125323 A1 | 5/2011 | Gutmann et al. |
| 2011/0148714 A1 | 6/2011 | Schantz et al. |
| 2011/0150348 A1 | 6/2011 | Anderson |
| 2011/0153338 A1 | 6/2011 | Anderson |
| 2011/0163160 A1 | 7/2011 | Zini et al. |
| 2011/0216185 A1 | 9/2011 | Laws et al. |
| 2011/0218670 A1 | 9/2011 | Bell et al. |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 | 7/2012 | Andersen et al. |
| 2012/0239224 A1 | 9/2012 | McCabe et al. |
| 2012/0287280 A1 | 11/2012 | Essati et al. |
| 2012/0323431 A1 | 12/2012 | Wong et al. |
| 2013/0006420 A1 | 1/2013 | Karlsson et al. |
| 2013/0101230 A1 | 4/2013 | Holeva et al. |
| 2013/0275045 A1 | 10/2013 | Tsujimoto et al. |
| 2014/0350831 A1* | 11/2014 | Hoffman ................ G06Q 10/00 701/117 |

FOREIGN PATENT DOCUMENTS

| | | |
|---|---|---|
| CN | 101936744 A | 1/2011 |
| DE | 10234730 A1 | 2/2004 |
| DE | 102007021693 A1 | 11/2008 |
| EP | 0508793 A2 | 4/1992 |
| EP | 1034984 A2 | 12/1999 |
| EP | 1201536 A2 | 5/2002 |
| EP | 1732247 A1 | 3/2005 |
| EP | 1731982 A1 | 12/2006 |
| EP | 1995206 A1 | 11/2008 |
| GB | 2389947 A | 7/2002 |
| JP | 52-066260 | 6/1977 |
| JP | 60067818 | 4/1985 |
| JP | 2000255716 A | 9/2000 |
| JP | 2002048579 | 2/2002 |
| JP | 2002108446 | 4/2002 |
| JP | 2005114546 | 4/2005 |
| JP | 2007010399 A | 1/2007 |
| JP | 2007257274 A | 10/2007 |
| JP | 2008009818 A | 1/2008 |
| KR | 100814456 B1 | 3/2008 |
| WO | 01/67749 A2 | 9/2001 |
| WO | 02/083546 A1 | 10/2002 |

(56) References Cited

FOREIGN PATENT DOCUMENTS

| WO | 03/042916 | A1 | 5/2003 |
|----|-----------|----|--------|
| WO | 03/096052 | A2 | 11/2003 |
| WO | 2004015510 | A1 | 2/2004 |
| WO | 2005068272 | A2 | 7/2005 |
| WO | 2006128124 | A2 | 11/2006 |
| WO | 2011044298 | A2 | 4/2011 |
| WO | 2011085426 | A1 | 7/2011 |
| WO | 2012166970 | A1 | 12/2012 |

OTHER PUBLICATIONS

Office Action dated Jun. 22, 2016 pertaining to Chinese Patent Application No. 201280018127.5.
Australian Examination Report dated Jun. 13, 2014, for Australian Application No. 201221652.
Australian Examination Report dated Jun. 5, 2014, for Australian Application No. 2012243484.
Australian Examination Report dated May 1, 2014, for Australian Application No. 2012300353.
Australian Examination Report dated May 14, 2014 for Australian Application No. 2012259536.
Australian first examination report pertaining to Australian patent application No. 2012304464, dated Jul. 23, 2014.
Azizi et al., "Mobile Robot Position Determination", Recent Advances in Mobile Robotics, Dr. Andon Topalov (Ed.), ISBN: 978-953-307-909-7, In Tech, Available from: http://www.intechopen.com/books/recent-advances-in-mobile-robotics/mobile-robot-position-determination, pp. 737-742, Dec. 2011.
Borenstein et al., "Mobile Robot Positioning—Sensors and Techniques", Journal of Robotic Systems, Special Issue on Mobile Robots, vol. 14, No. 4, pp. 231-249, Apr. 1997.
Communication pursuant to Rules 161(1) and 162 EPC dated Apr. 17, 2014 pertaining to European Application No. 12773426.7.
European Search Report for Application No. 12770733.9 dated Sep. 1, 2014.
Extended European Search Report dated May 9, 2014 pertaining to European Appl. No. 11750974.5.
Extended European Search Report dated Nov. 18, 2014 pertaining to European Patent Application No. 12789246.1.
Feng et al., "Model-based Calibration for Sensor Networks", Proceedings of IEEE, vol. 2, pp. 737-742, Print ISBN: 0-7803-8133-5, Sensors, 2003.
Guizzo, "Three Engineers, Hundreds of Robots, One Warehouse," IEEE Spectrum, Jul. 2008. Harmon et al., "A Technique for Coordinating Autonomous Robots", Autonomous Systems Branch Naval Ocean Systems Center San Diego, CA 92152, 1986.
Hesch, J. et al., "A Laser-Aided Inertial Navigation System (L-INS) for Human Localization in Unknown Indoor Environments", 2010 IEEE International Conference on Robotics and Automation; May 3-8, 2010; pp. 5376-5382; Anchorage, Alaska.
Ibanez-Guzman, J et al., "Unmanned Tracked Ground Vehicle for Natural Environments", no date; pp. 1-9, Dec. 2004.
International Search Report and Written Opinion pertaining to International Patent Application No. PCT/NZ2012/000084, dated Jan. 30, 2013.
International Search Report and Written Opinion dated Oct. 9, 2013 for PCT/NZ2012/000092.
Jansfelt et al., "Laser Based Position Acquisition and Tracking in an Indoor Environment", Proc. Int. Symp. Robotics and Automation, 1998.
Korean Notice of Preliminary Rejection dated May 1, 2014, for Korean Application No. 10-2014-7000894.
Korean Preliminary Rejection dated Aug. 29, 2014 pertaining to Korean Application No. 10-2014-7000140 (with English translation).

Notice of Allowance pertaining to U.S. Appl. No. 13/300,041 dated Dec. 16, 2013.
Office Action dated Jun. 4, 2014, for U.S. Appl. No. 13/672,391.
Office Action dated Dec. 31, 2014 pertaining to Chinese Patent Application No. 201280036678.4.
Office Action dated Aug. 31, 2015 pertaining to Chinese Patent Application No. 201280041527.8.
Office Action from U.S. Appl. No. 12/660,616 dated No. 27, 2012.
Office Action from U.S. Appl. No. 12/948,358 dated Apr. 8, 2013.
Office Action from U.S. Appl. No. 13/166,600 dated Dec. 31, 2012.
Office Action dated Jul. 13, 2013 from U.S. Appl. No. 13/227,165, filed Sep. 7, 2011.
Office Action dated Jun. 4, 2013 from U.S. Appl. No. 13/159,501, filed Jun. 14, 2011.
Office Action dated May 2, 2013 from U.S. Appl. No. 12/718,620, filed Mar. 5, 2010.
Office Action dated May 8, 2013 from U.S. Appl. No. 13/672,260, filed Nov. 8, 2012.
Office Action pertaining to U.S. Appl. No. 12/948,358 dated Apr. 5, 2012.
Office Action pertaining to U.S. Appl. No. 12/948,358 dated Aug. 24, 2012.
Office Action pertaining to U.S. Appl. No. 13/153,743 dated Mar. 4, 2013.
Office Action pertaining to U.S. Appl. No. 13/159,500, dated Mar. 26, 2013.
Office Action pertaining to U.S. Appl. No. 13/219,271, dated Feb. 25, 2013.
Office Action pertaining to U.S. Appl. No. 13/300,041 dated Sep. 19, 2013.
Office action pertaining to U.S. Appl. No. 14/110,950.
Search Report/Written Opinion from PCT/NZ2012/000051 dated Jan. 2, 2013.
Search Report/Written Opinion from PCT/NZ2012/000091 dated Oct. 31, 2012.
Search Report/Written Opinion from PCT/US2012/052247 dated Nov. 27, 2012.
Siadat et al., "An Optimized Segmentation Method for a 2D Laser-Scanner Applied to Mobile Robot Navigation", Proceedings of the 3rd IFAC Symposium on Intelligent Components and Instruments for Control Application, 1997.
Thomson et al., "Efficient Scheduling for Multiple Automated Non-Holonomic Vehicles Using a Coordinated Path Planner", IEEE International Conference on Robotics and Automation (ICRA), pp. 1-4, May 9, 2011.
U.S. Appl. No. 13/159,500, filed Jun. 14, 20122 entitled "Method and Apparatus for Sharing Map Data Associated with Automated Industrial Vehicles"; 37 pgs.
U.S. Appl. No. 13/159,501, filed Jun. 14, 2011 entitled "Method and Apparatus for Facilitating Map Data Processing for Industrial Vehicle Navigation"; 38 pgs.
U.S. Appl. No. 13/116,600, filed May 26, 2011, entitled: "Metod and Apparatus for Providing Accurate Localization for an Industrial Vehicle", Lisa Wong et al., 47 pages.
Written Opinion of the International Searching Authority, dated Nov. 30, 2011 for PCT Application No. PCT/NZ2011/000025.
Xia, T.K. et al., "Vision Based Global Localization for Intelligent Vehicles", Intelligent Vehicles Symposium, Tokyo, Japan, Jun. 13-15, 2006; pp. 1-6.
Yong, "Real-time Dynamic Path Planning for Dubins' Nonholonomic Robot", 45th IEEE Conference on Decision and Control, pp. 2418-2423, 2006.
Chinese Patent Office Action/Search Report dated Oct. 18, 2016 in reference to co-pending Chinese Patent Application No. 201280018127.5 filed Apr. 10, 2012.

* cited by examiner

SYSTEM FOR EFFICIENT SCHEDULING FOR MULTIPLE AUTOMATED NON-HOLONOMIC VEHICLES USING A COORDINATED PATH PLANNER

CROSS REFERENCE TO RELATED APPLICATIONS

The present application is a continuation of U.S. application Ser. No. 14/110,950 filed Oct. 10, 2013, titled "Method and Apparatus for Efficient Scheduling for Multiple Automated Non-Holonomic Vehicles Using a Coordinated Path Planner," which was a National Stage of International Application No. PCT/NZ2012/000051, filed Apr. 10, 2012, titled "Method and Apparatus for Efficient Scheduling for Multiple Automated Non-Holonomic Vehicles Using a Coordinated Path Planner," and claims the benefit of U.S. Provisional Application No. 61/474,030 filed Apr. 11, 2011, titled "Method and Apparatus for Efficient Scheduling for Multiple Automated Non-Holonomic Vehicles Using a Coordinated Path Planner."

BACKGROUND OF THE INVENTION

Technical Field

Embodiments of the present disclosure generally relate to a vehicle management system and, more particularly, to a method and apparatus for efficient scheduling for multiple automated non-holonomic vehicles using a coordinated path planner.

Description of the Related Art

Automated Vehicles (AVs) operate in mixed-use, multi-vehicle, dynamic warehouse environments. The nature of this environment can cause automated vehicles to become impeded by unknown obstacles or situations as they go about the execution of tasks. This delay causes any a priori planning to become obsolete as the interaction of automated vehicles may cause deadlocks, and time critical tasks become at risk for completion. Factors including overall driving time, vehicle constraints such as non-holonomic motion and fuel usage also impact planning. These problems have motivated the development and implementation of the presented scheduling solution using coordinated paths for multiple vehicles.

Although research into multi-vehicle path planning is not a new topic, for example, a coordinated approached is used in constraining robots to defined roadmaps resulting in a complete and relatively fast solution, a near-optimal multi-vehicle approach for non-holonomic vehicles focuses on continuous curve paths that avoid moving obstacles and are collision free is not available. Even though these solutions are useful, the problem consideration is not broad enough to be used directly within the targeted industrial environment. There may be requirements to have high utilization of resources and throughput of product. Current approaches used to solve the planning and scheduling problem, particularly with multiple vehicles have often been too limited in scope to address and attempt to optimize solutions.

Therefore, there is a need in the art for a method and apparatus for efficient scheduling of multiple non-holonomic automated vehicles using coordinated path planning.

SUMMARY

A method for coordinating path planning for one or more automated vehicles is described, including querying an online path planner for possible solutions for at least one executable task for each of the one or more automated vehicles, examining the results of the query, deciding a coordinated path plan for each vehicle, and communicating the coordinated path plan to a traffic manager, wherein the traffic manager ensures that the one or more automated vehicles perform each executable task according to the coordinated path plan.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Given a set of objectives, such as moving product around a warehouse, various embodiments of a method and apparatus for efficient scheduling of multiple non-holonomic automated vehicles using coordinated path planning finds a solution that optimizes resource utilization while meeting current and future task deadlines according to some embodiments. An objective can be defined for the optimization including terms for maneuvering speeds, fuel usage, and upcoming tasks locations. The speed at which planning solutions are found allows many different possibilities for current and future objectives to be evaluated enabling the best solution to be selected. Solutions for paths are also extended by using smooth, continuous curvature paths, to allow an automated vehicle to drive paths without having to stop.

The present disclosure describes a multi-vehicle path planning and scheduling apparatus or system for non-holonomic automated vehicles. This apparatus been developed for use on automated vehicles (e.g., robots, automated forklifts and/or the like) for solving planning problems.

Generally, non-holonomic (also referred to as anholonomic) include systems whose states are defined by paths that are used to arrive at the states.

Planning time and scalability are critical factors for functional systems. To help reduce search space and solution calculation time a constraint for the total number of automated vehicles in a multi-level node is introduced. This limits search complexity with little negative impact since automated vehicles do not generally need to occupy the same area in the warehouse. Fast planning times has allowed forecast plans to be generated. Forecasting allows the scheduling component to spend more time finding an optimal solution without impacting the current movement automated vehicles. Forecasting also provides a level of visibility for completion of orders and helps to ensure that automated vehicle utilization is efficient not only for the current task but for up-coming tasks as well.

Motivated by the flexible use of automated vehicles and the interaction with an environment (e.g., a warehouse), the present disclosure also describes coordinated path planning while allowing automated vehicles to drive on and/or off from a roadmap graph. This enables an automated vehicle to be turned on at any position and drive to the end of a path with enough accuracy to be able to correctly interact with the environment when carrying out tasks. Furthermore, because blocked paths can cause other path segments to also become blocked, preventing other automated vehicles from attempting to drive through that area improves resource utilization and saves a significant amount of travel time that would be otherwise wasted waiting for the area to clear or determining an alternate path that avoids the obstruction and the blocked path.

Figure 1:
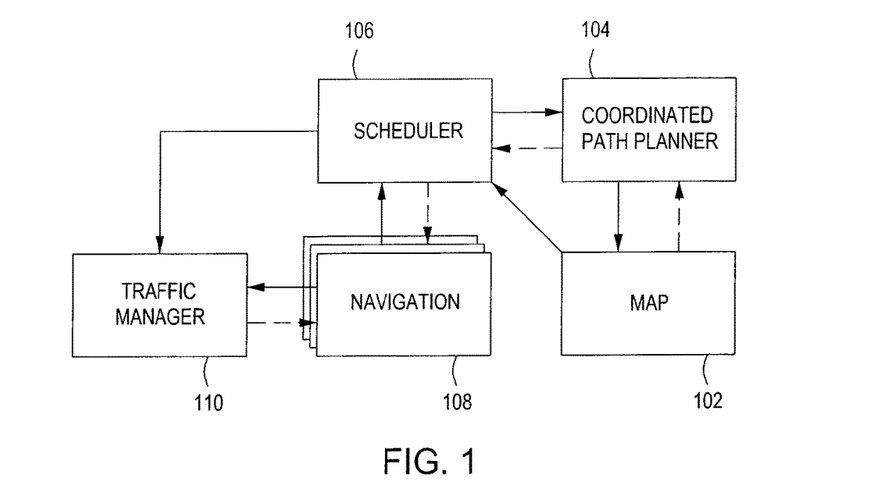
FIG. 1 is a functional block diagram illustrating an apparatus for efficient scheduling of automated vehicles using a map and implementing a coordinated path planner according to various embodiments.

FIG. 1 is a functional block diagram illustrating an apparatus 100 for efficient scheduling of automated vehicles using a map 102 and implementing a coordinated path planner 104 according to various embodiments. In addition to the coordinated path planner 104, the apparatus 100 implements various modules (e.g., software code, firmware, hardware components and/or the like), such as a scheduler 106, a navigation module 108 and a traffic manager 110.

In some embodiments, the scheduler 106 queries the coordinated path planner 104 with different possible solutions for one or more available automated vehicles (AVs) performing various available tasks. The scheduler 106 allocates these tasks to the automated vehicles more effectively by examining results of the possible solutions that are provided from the coordinated path planner 104. Once a decision is made as to which solution to execute, the scheduler 106 communicates a coordinated plan to the traffic manager 110 to manage and/or monitor the execution by the automated vehicles. The traffic manager 110 ensures that the automated vehicles perform the allocated tasks in accordance with the coordinated plan. Each automated vehicle includes the navigation module 108 for controlling vehicle movement (i.e., driving) and performing localization. The traffic manager 110 controls the travel distance based on a current execution state. As new information becomes available, such as changes to the map 102 or new tasks to consider, the scheduler 106 continues to find better solutions and reroute the automated vehicles along various paths.

Finding the best solution requires the scheduler 106 to query the coordinated path planner 104 regarding each and every possible solution for each of the available tasks by different automated vehicles. The scheduler 106 processes results for each solution and searches for the solution that closely satisfies the heuristic. A satisfactory run-time performance may be achieved by applying thresholds to the results and/or selecting the best solution within a given time period. Improving run-time performance prevents various problems, such as delays caused by idling, wasting of resources and/or missing deadlines.

The scheduler 106 forecasts future solutions based on information about up-coming tasks according to some embodiments. During planning for an automated vehicle, another automated vehicle moves to a location and blocks an area for an estimated amount of time while executing some aspect of a current task. Such an estimated amount of time is taken into account during path planning and scheduling. Once the time estimate elapses, the other automated vehicle may drive to a different location. As a result, task execution by the automated vehicle does not conflict with the execution of the current task by the other automated vehicle. Identifying and avoiding problematic situations (e.g., positions that are inescapable) improves time efficiencies and utilization in the long run.

In response to a query from the scheduler 106, the coordinated path planner 104 returns time estimates for each possible configuration of one or more automated vehicles. Various factors can influence each time estimate. For example, allocating an automated vehicle to a task may adversely impact other automated vehicles that are also completing tasks or are idle. Because starting idle automated vehicles costs time and resources (e.g., fuel), the scheduler 106 uses a heuristic that reflects such costs according to some embodiments. For example, the coordinated path planner 104 adds terms that represent costs for starting idle automated vehicles.

The apparatus 100 may perform coordinated path planning continuously or periodically. In some embodiments, as tasks become available over time, the coordinated path planning is subsequently performed instead of all at once due to calculation time and limited information. Optionally, whenever an event occurs, such as a new task or a change to the map 102, a current schedule becomes invalidated as there could potentially be a better solution. Scheduling, however, is not instantaneous and it would be inefficient to have the automated vehicles stop driving while a new plan is being calculated. In some embodiments, the scheduler 106 communicates a specific time to the traffic manager 110 after which the automated vehicles will stop; the traffic manager 110 also returns the estimated position of the automated vehicles at that time.

In the meantime, the scheduler 106 performs path planning and scheduling from this time with the updated event. When the time is expired, the scheduler 106 selects the best solution discovered thus far, assuming such a solution is within a pre-defined threshold and updates the current schedule. If the threshold is not met, then further planning is necessary. If the event does not change the immediate plan, the automated vehicles continue executing tasks seamlessly.

In an industrial environment (e.g., a warehouse), various areas will often become unavailable for transiting due a number of reasons, such as automated vehicle malfunction or an obstruction (e.g., an obstacle that is not included in the map 102). As explained in detail further below, because a size of the search space (e.g., a supergraph comprising each and every configuration of automated vehicles as explained further below) precludes making changes online whenever there are changes to the map 102, a list of blocked nodes are recorded instead. The coordinated path planner 104 examines such a list when performing path planning in order to stop different automated vehicles from path planning and/or navigating paths through these areas. If it is known that the same nodes are going to be blocked for a while, then the offline measurements against the heuristic are recalculated according to some embodiments.

Instead of using standard Dubins paths for non-holonomic automated vehicles, the coordinated path planner 104 modifies Dubins paths to add transitioning periods of constant change in curvature. A continuous change in curvature path is desired to allow the automated vehicle to drive accurately at a higher speed. In some embodiments, the apparatus 100 implements the modified Dubins paths by constructing graph segments and joining paths out of smooth paths. The joining paths can have sharper turns at the ends and smoother turns where the joining paths join the graph as the automated vehicle will be going faster once the automated vehicle hits the graph. Because of the extra space that these paths require, the joining of the joining paths need to be repeated with sharper path segments if the joining fail on smoother ones.

Figure 2:
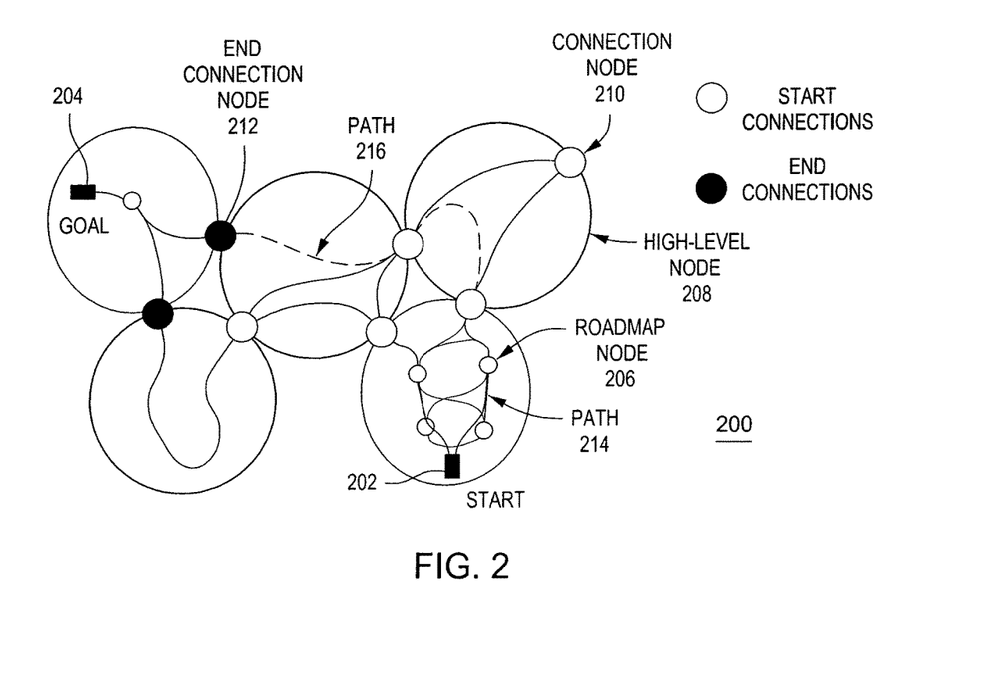
FIG. 2 illustrates a multi-level graph for performing coordinated path planning of an automated vehicle according to various embodiments.

FIG. 2 illustrates a multi-level graph 200 for performing coordinated path planning of an automated vehicle according to various embodiments. The coordinated path planner 104 considers each and every automated vehicle together as one composite unit with one or more degrees of freedom. Starting positions of the automated vehicles are one configuration of this unit and goal positions are another configuration. Each configuration may constitute a state in a non-holonomic system.

As illustrated, the multi-level graph 200 defines a start position 202 and a goal position 204 for the composite unit of one or more automated vehicles. A total number of possible configurations are limited by discretizing the multi-level graph 200 into a roadmap graph as explained in detail further below. The movement of the one or more automated vehicles may be represented as a series of configurations. Each configuration defines positions for the one or more automated vehicles, which may include one or more roadmap nodes, such as a roadmap node 206, one or more connection nodes on a high-level node, such as a high-level node 208. A configuration may correspond to another configuration when the one or more automated vehicles move between connected roadmap nodes as long as these movements do not result in a collision.

In some embodiments, the coordinated path planner 104 places various types of nodes throughout the map and then, joins these nodes using path segments forming a roadmap graph. The various types of nodes include, but are not limited to, the roadmap node 206, the high-level node 208, a connection node 210 and an end connection node 212. The path segments connecting various ones of the nodes include, but are not limited to, a path 214 and a path 216. The automated vehicles move from node to node along the path segments until the automated vehicles reach the goal position 204.

The coordinated path planner 104, in an offline process, forms high-level nodes using all of the possible combinations or configurations of the automated vehicles at different roadmap nodes. These high-level nodes are connected by moving one automated vehicle along a connected path segment to reach another high-level node. The coordinated path planner 104 uses various computation techniques (e.g., supergraph computation techniques) to remove any unfeasible solutions. In some embodiments, the high-level nodes and associated connections form a supergraph. Hence, the supergraph includes each and every automated vehicle configuration within the multi-level graph 200. By traversing the supergraph at runtime, the scheduler 106 searches for the best solution to path planning without having to do any intersection calculations, which were performed offline.

In some embodiments, the coordinated path planner 104 uses a heuristic for searching the multi-level graph 200 for the best solution (i.e., path). For example, the heuristic may be a travel time of automated vehicles between nodes. Estimates of travel times can be established offline and summed for all of the automated vehicles operating at a particular schedule. The coordinated path planner 104 repeats the path planning process leading to the selection of the best solution when compared with the heuristic.

In some embodiments involving large areas with several automated vehicles, the coordinated path planner 104 utilizes a multi-level graph, such as the multi-level graph 200, in order to reduce a size of a search space. The coordinated path planner 104 groups various nodes, such as roadmap nodes and connections nodes, into higher level nodes as illustrated. A solution is first found for a higher level portion of the multi-level graph 200, followed by a more specific solution for the next level down until a complete roadmap-level path is finalized.

The search space is further reduced by constraining the number of automated vehicles within high-level nodes. This constraint is possible given the industrial environment layouts which often can only effectively allow one or two automated vehicles in a given area. The multi-level graph 200 will result in a less optimal solution as it assumes the best high level search will contain the best lower level search, this is a tradeoff for calculation time. Measurements for evaluation against the heuristic may be computed offline for the multi-level graph 200.

In some embodiments with high vehicle traffic, the solution found by the coordinated path planner 104 will resolve such issues by requiring one or more automated vehicles to wait until other vehicles to pass specific locations. Such resolutions are noted in the plan as dependencies between vehicles with the corresponding locations. The traffic manager 110 interprets these dependencies while the solution is executed, and ensures the vehicles adhere to these dependencies when determining the distances vehicles are permitted to drive.

In some embodiments, the automated vehicles will not always start off or finish on a position on the path 216. This occurs when automated vehicles are manually driven and start anywhere within the known area or need to engage with items placed by human drivers who do not place items on the multi-level graph 200. To solve this problem, for each automated vehicle, a path from the start position to a node and a path from a node to the goal position 204 needs to be calculated. As long as there is sufficient coverage of the roadmap, then a Dubins path or similar path will suffice.

There may be several options of nodes to join, and the closest node may not necessarily be the optimum. An important advantage of the approach described in the present disclosure is that calculation speed allows determination of near optimum join locations. It may also be more efficient to join along a roadmap edge rather than at a node. In order to narrow down the joining possibilities for an automated vehicle, a grid can be calculated offline that will contain possible nodes that can be reached from within each grid square. At runtime the possible nodes are retrieved and a binary scan is performed along their connecting path segments to determine the best place to join. The top path segments are chosen as options for the search, the node at the end of the segment is used. These graph joining paths should be chosen such that they do not intersect the start/goal positions or the start/goal nodes of other automated vehicles, this will allow them to reach their initial node and leave their last node without causing a deadlock. Calculating the joiners does mean there will be some intersection calculations at run time but the areas are small and can be resolved quickly if the map 102 is broken down into a quad-tree.

Figure 3:
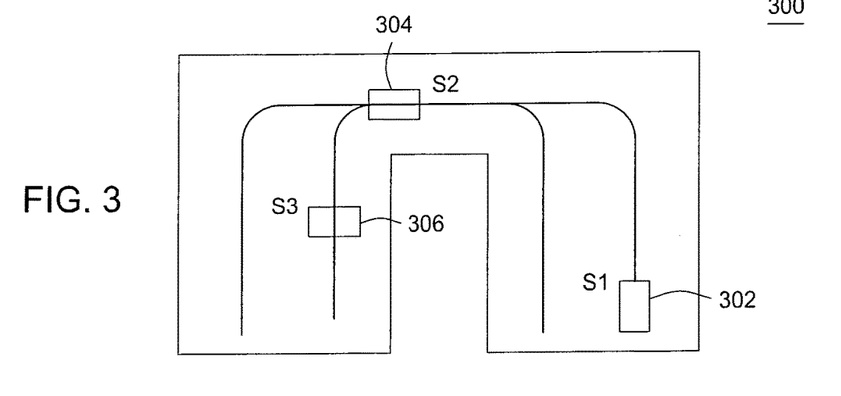
FIG. 3 is an exemplary roadmap graph illustrating a warehouse comprising automated vehicles according to various embodiments.

FIG. 3 is an exemplary roadmap graph 300 illustrating a warehouse comprising automated vehicles according to various embodiments.

The roadmap graph 300 depicts three automated vehicles whose task is to pick up items from a right side of a map and transport the picked up items to a left side according to some embodiments. A first automated vehicle 302 picks up an item, which must be returned to the other side of the warehouse. Subsequently, one of the other two automated vehicles is to come and pick up a next item on the right side. There are at least two solutions for the scheduler 106: use a second automated vehicle 304 or a third automated vehicle 306 to pick up the item. All of the possible solutions, along with moving the first automated vehicle 302 to the left, are communicated to the coordinated path planner 104 where paths with estimated times to completion are computed.

TABLE I

ESTIMATED TIMES USING DIFFERENT AUTOMATED VEHICLES

| | | Estimated Travel Times | | |
|---|---|---|---|---|
| | | AV 302 | AV 304 | AV 306 |
| AV chosen for right pick up | AV 304 | 34.13 | 19.43 | 5.76 |
| | AV 306 | 36.30 | 10.11 | 44.74 |

The resulting time estimates are shown in Table I, the second automated vehicle 304 is favored for the task as it is closer and is blocking the corridor. This solution is described with respect to FIG. 4. Because starting up idle automated vehicles may be undesirable, a cost is applied to this activity in some embodiments. This solution is described with respect to FIG. 5.

In some embodiments, the coordinated path planner 104 and the scheduler 106 account for instances where an automated vehicle must wait for another automated vehicle. Wait positions and time estimates are computed for these instances and incorporated into path planning and scheduling, as described with respect to FIG. 4 and FIG. 5. Continuous curvature paths are used in FIGS. 4 and 5 on the roadmap graph and the joining paths. The joining paths are sharper at the ends as the automated vehicles are traveling slower.

Table II depicts estimated travel times for the first automated vehicle 302, the second automated vehicle 304 and the third automated vehicle 306 that take into account a time spent turning on an automated vehicle.

TABLE II

| Estimated Travel Times | | |
|---|---|---|
| AV 302 | AV 304 | AV 306 |
| 39.78 | 19.43 | 0.00 |

Figure 4:
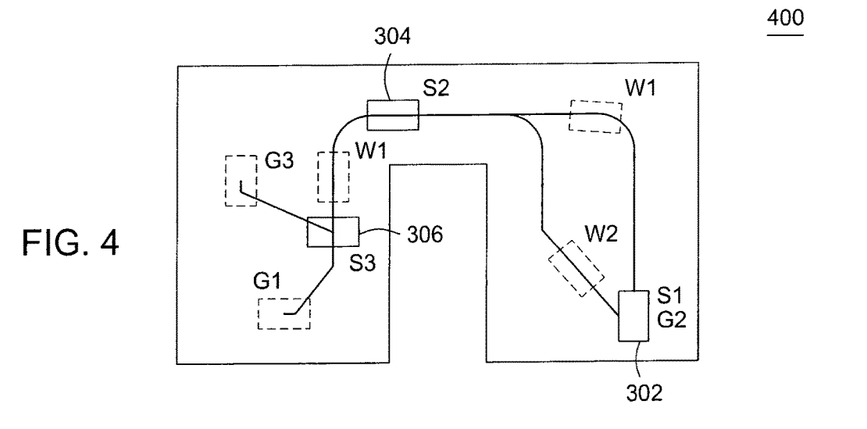
FIG. 4 is an exemplary roadmap graph depicting a scheduling solution for automated vehicles within a warehouse according to various embodiments.

FIG. 4 is an exemplary roadmap graph 400 depicting a solution for scheduling automated vehicles within a warehouse, such as the warehouse being depicted in FIG. 3, according to various embodiments. The first automated vehicle 302 commences the task at start position S1 (i.e., a rectangular area left of label "S1" on the roadmap graph 400) and picks up the item. The third automated vehicle 306 moves in order to complete the task as quickly as possible while the first automated vehicle 302 uses a joining path to reach a goal position G1 with two potential wait locations labeled W1.

As depicted on the roadmap graph 400, the start position S1 is also goal position G2 for the second automated vehicle 304. Accordingly, the second automated vehicle 304 moves to goal position G2 in order to pick up the next item with a wait location W2. In some embodiments, the first automated vehicle 302 stops and waits for the second automated vehicle 304 to move to the goal position G2 and/or waits for the third automated vehicle 306 to move to goal position G3. In some embodiments, the third automated vehicle 306 is located at start position S3 and constitutes an obstruction to the movement of the first automated vehicle 302 and must be moved out of the path. In other embodiments, the second automated vehicle 304 is located at start position S2. While moving to the goal position G2, the second automated vehicle 304 waits, at wait location W2, for the first automated vehicle 302 to leave an area around the goal position G2, which is also labeled the start position S1.

Figure 5:
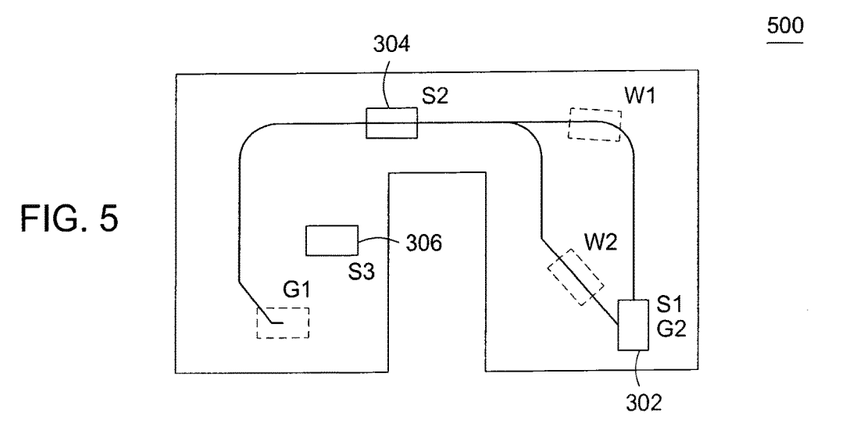
FIG. 5 is an exemplary roadmap graph depicting another scheduling solution for automated vehicles within a warehouse according to various embodiments.

FIG. 5 is an exemplary roadmap graph 300 depicting another solution for scheduling automated vehicles within a warehouse, such as the warehouse being depicted in FIG. 3, according to various embodiments. In some embodiments, the other solution differs from the solution depicted in FIG. 4 in several respects. For example, a coordinated path planner that is configured according to this solution assigns a higher cost for starting an automated vehicle. The first automated vehicle 302 commences the task at start position S1 and picks up the item. While the first automated vehicle 302 uses a joining path to reach a goal position G1 with a potential wait location labeled W1, the second automated vehicle 304 moves from start position S2 and moves to goal position G2, which is also the start position S1. Even though the first automated vehicle 302 has to travel slightly longer in time, the third automated vehicle 306 does not have to start up, which results in significant cost savings. The third automated vehicle 306 does not need to move from position S3 in order to complete the task as quickly as possible.

Figure 6A:
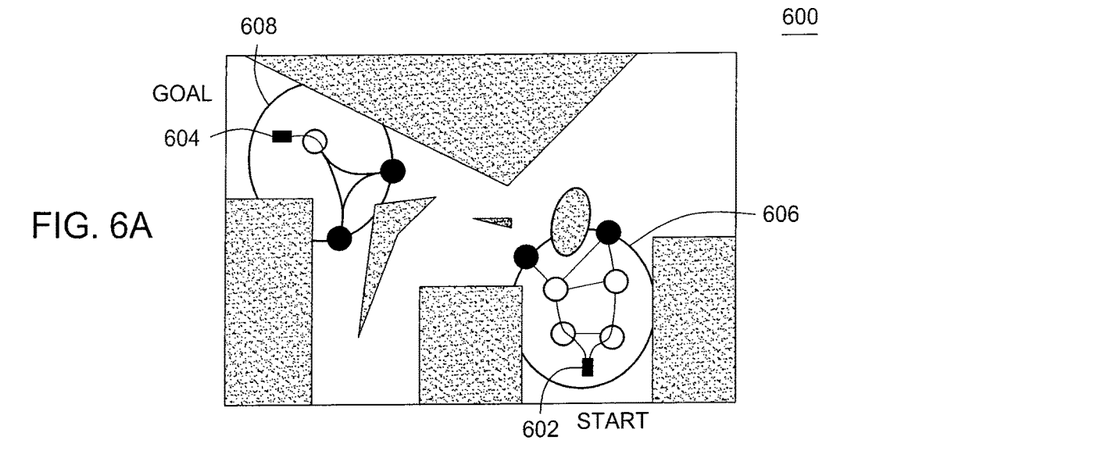
FIGS. 6A-C illustrate various levels of a multi-level graph for efficient scheduling of multiple non-holonomic automated vehicles using coordinated path planning according to various embodiments.
Figure 6B:
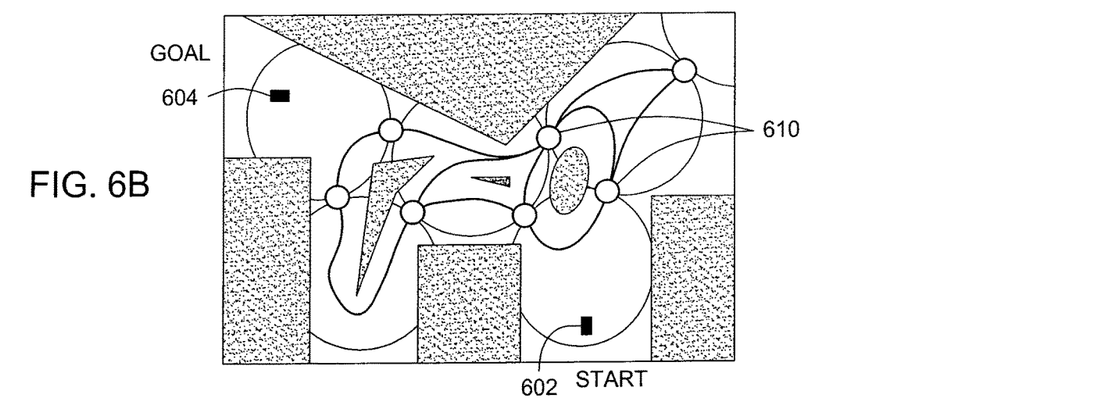
Figure 6C:
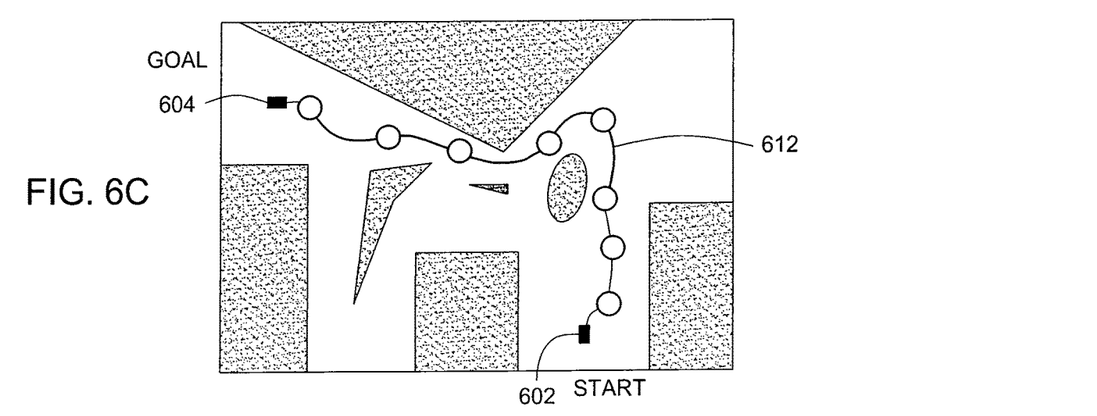

FIG. 6A-C illustrate various levels of a multi-level graph 600 for efficient scheduling of multiple non-holonomic automated vehicles using coordinated path planning according to various embodiments. FIGS. 6A-C depict path planning between a start position 602 and a goal position 604 by determining optimal local paths between various high-level nodes, such as a high-level node 606 and a high-level node 608. FIG. 6A and FIG. 6B may be referred to as high-level graphs and FIG. 6C may be referred to as a base roadmap graph. It is appreciated that several higher level graphs may be used for coordinated path planning. For example, larger environments may require more than two higher level graphs and one base roadmap graph.

In some embodiments, a coordinated path planner determines the optimal local paths between one or more connection nodes, which are nodes located on a periphery of the high-level nodes. The coordinated path planner may determine a path between connection nodes 610 as illustrated in FIG. 6B. Such an optimal local path may connect one or more roadmap nodes (e.g., the roadmap node 206 of FIG. 2), which are located inside each high-level node. In other embodiments, the coordinated path planner computes an optimal local path that does not go through at least one roadmap node.

Subsequently, a local path is determined between the start position 602 and a local connection node (e.g., a start connection node). In some embodiments, such a path includes one or more inner roadmap nodes. The coordinated path planner 104 may compute a second local path between the goal position 604 and a local connection node (e.g., an end connection node, such as the end connection node 212 of FIG. 2) in a similar manner. In some embodiments, the coordinated path planner combines the local paths to form a final path 612 on the multi-level graph 600 as illustrated in FIG. 6C. In some embodiments, the coordinated path planner 104 selects a lowest cost path that includes these local paths and high level paths to the local connection node associated with the goal position 604. Optimal high-level paths within the high-level node 606 and the high-level node 608 are then computed. These paths may not necessarily match with any portion of the lowest cost path because of various factors, such as other vehicles operating at or around a same time. Once the coordinated path planner 104 determines an optimal path at a lowest-level (i.e., a roadmap-level), the coordinated path planner 104 returns this result as the final path 612 according to one or more embodiments.

Figure 7:
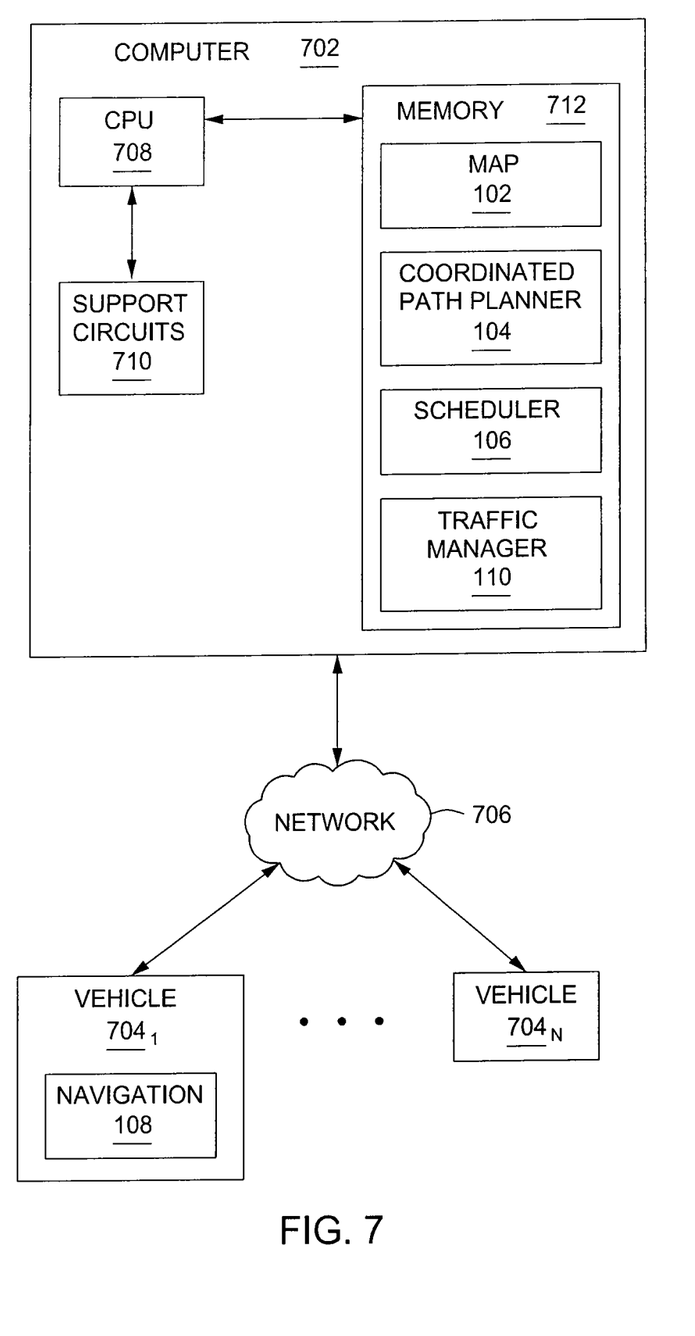
FIG. 7 is a block diagram illustrating a system for efficient scheduling and path planning of automated vehicles using a map and implementing a coordinated path planner according to various embodiments.

FIG. 7 is a structural block diagram of a system 700 for efficient scheduling for multiple automated non-holonomic vehicles using a coordinated path planner, such as the coordinated path planner 104, according to one or more embodiments. In some embodiments, the system 700 includes a computer 702 and a plurality of vehicles 704 (illustrated as a vehicle $704_1$ ... a vehicle $704_N$) in which each component is coupled to each other through a network 706. Each of the plurality of vehicles 704 includes a navigation module, such as the navigation module 108, for operating various vehicle components, such as steering and/or motion components. It is appreciated that the plurality of vehicles 704 may utilize one or more computers for executing the navigation module 108.

The computer 702 is a type of computing device (e.g., a laptop, a desktop, a Personal Desk Assistant (PDA) and the like). Each of the vehicles 704 includes a type of computing device (e.g., a laptop computer, a desktop computer, a Personal Desk Assistant (PDA) and the like). A computing device, generally, comprises a central processing unit (CPU) 708, various support circuits 710 and a memory 712. The CPU 708 may comprise one or more commercially available microprocessors or microcontrollers that facilitate data processing and storage. Various support circuits 710 facilitate operation of the CPU 708 and may include clock circuits, buses, power supplies, input/output circuits and/or the like. The memory 712 includes a read only memory, random access memory, disk drive storage, optical storage, removable storage, and the like. The memory 712 includes various data, such as the map 110, as well as various software packages, such as the coordinated path planner 104, the schedule 106 and the navigation module 108. These software packages implement an apparatus, such as the apparatus 100 of FIG. 1, for efficient scheduling of the automated vehicles 704.

In some embodiments, the coordinated path planner 104 includes software code (e.g., processor executable instructions) that is executed by the CPU in order to respond to queries from the scheduler 106 as described in the present disclosure. The coordinated path planner 104 determines time estimates for each and every possible solution for completing a task. These time estimates are used for evaluating the possible solutions. In some embodiments, the scheduler 106 selects a solution for scheduling the automated vehicles 704 evaluated against a heuristic. The scheduler 106 communicates instructions (e.g., a schedule) to the traffic manager 110, which uses the navigation module 108 to control automated vehicle operations and movements.

The network 706 comprises a communication system that connects computers by wire, cable, fiber optic, and/or wireless links facilitated by various types of well-known network elements, such as hubs, switches, routers, and the like. The network 706 may employ various well-known protocols to communicate information amongst the network resources. For example, the network 706 may be part of the Internet or intranet using various communications infrastructure such as Ethernet, WiFi, WiMax, General Packet Radio Service (GPRS), and the like.

While the foregoing is directed to embodiments of the present invention, other and further embodiments of the invention may be devised without departing from the basic scope thereof, and the scope thereof is determined by the claims that follow.

What is claimed is:

1. A system for coordinated path planning in a multivehicle warehouse environment, the system comprising a plurality of automated vehicles for moving a product around the multivehicle warehouse and one or more central processing units, wherein:

each automated vehicle of the plurality of automated vehicles comprises a memory comprising a navigation module; and the one or more central processing units are communicatively coupled to the plurality of automated vehicles and execute instructions to:

receive an executable task in the multivehicle warehouse for one or more of the plurality of automated vehicles, select a coordinated path plan for a number of the plurality of automated vehicles for which the executable task has been received, wherein the coordinated path plan is selected with the one or more central processing units from a solution set of roadmap graphs from a multi-level graph, the multi-level graph comprising a plurality of graph levels with respect to a floor portion of the multivehicle warehouse, the plurality of graph levels comprising at least a higher level graph of the floor portion and a lower level graph of the floor portion, the higher level graph comprising a plurality of high-level nodes, the lower level graph comprising a plurality of lower-level nodes, each lower-level node disposed in a position within or on a boundary of a respective high-level node of the plurality of high-level nodes, each lower-level node comprising a smaller surface area than the respective high-level node with respect to the floor portion, and the solution set of roadmap graphs comprising one or more unique combinations of lower-level nodes and high-level nodes and path segments connection various ones of the lower-level nodes and the high-level nodes, communicate at least a portion of the coordinated path plan to the number of the plurality of automated vehicles for which the executable task has been received such that respective navigation modules of the number of the plurality of automated vehicles navigate a respective automated vehicle, according to the received portion of the coordinated path plan, receive an up-coming executable task in the multivehicle warehouse for one or more of the plurality of automated vehicles, use the up-coming executable task to forecast a revised coordinated path plan for the number of the plurality of automated vehicles operating according to the received portion of the coordinated path plan, and communicate at least a portion of the revised coordinated path plan to the number of the plurality of automated vehicles for which the up-coming executable task has been received such that, upon receipt of instructions to execute the up-coming executable task, respective navigation modules of the number of the plurality of automated vehicles navigate the respective automated vehicle, according to the received portion of the revised coordinated path plan.

2. The system as claimed in claim 1 wherein the one or more central processing units execute instructions to monitor the plurality of automated vehicles to ensure the plurality of automated vehicles are performing each executable task according to the coordinated path plan or the revised coordinated path plan.

3. The system as claimed in claim 1 wherein the one or more central processing units are communicatively coupled to the plurality of automated vehicles through a network.

4. The system as claimed in claim 1 wherein the one or more central processing units execute instructions to:
access the multi-level graph comprising high-level nodes, wherein the high-level nodes each correspond to a region of the multivehicle warehouse, each of the high level nodes comprises one or more lower-level nodes and one or more local paths, wherein:
the one or more lower-level nodes comprise one or more connection nodes corresponding to a boundary of the region, and one or more roadmap nodes corresponding to an interior of the region, and
the one or more local paths link the connection nodes, the roadmap nodes, or a combination thereof;
construct, with the one or more central processing units, a grid associated with the multivehicle warehouse, wherein the grid demarcates a plurality of grid squares, and respective grid squares contain a portion of the multivehicle warehouse and a portion of the corresponding multi-level graph;
select from the plurality of grid squares, with the one or more central processing units, grid squares corresponding to a start position, a goal position, or both, if the start position, the goal position, or both, are within the multivehicle warehouse but off the multi-level graph;
determine within one or more of the selected grid squares, with the one or more central processing units, joining paths from the start position, the goal position, or both, to the multi-level graph;
construct, with the one or more central processing units, the solution set of roadmap graphs from the multi-level graph, wherein each of the roadmap graphs comprises the start position linked via a final path to the goal position, and the final path comprises a determined joining path and at least a portion of the local paths.

5. The system as claimed in claim 4 wherein the one or more central processing units execute instructions to:
generate a list of blocked nodes corresponding to the high-level nodes, the connection nodes, and roadmap nodes that are unavailable; and
stop the plurality of automated vehicles from navigating a part of the region corresponding the blocked nodes.

6. The system as claimed in claim 4 wherein the one or more central processing units execute instructions to constrain a number of the plurality of automated vehicles permitted within each of the high-level nodes to reduce the time needed to construct a solution set of roadmap graphs.

7. The system as claimed in claim 4 wherein the number of the plurality of automated vehicles permitted within each of the high-level nodes is two or less.

8. The system as claimed in claim 4 wherein the one or more central processing units execute instructions to:
stop operation of the plurality of automated vehicles at a predetermined time; and
resume operation of the plurality of automated vehicles after a period of time has elapsed after the predetermined time, wherein the coordinated path plan is selected during the period of time.

9. The system as claimed in claim 4 wherein the one or more central processing units execute instructions to form a modified-Dubins path comprising joining paths at ends of the modified-Dubins paths and a continuous change in curvature path located between the joining paths, wherein the modified-Dubins path comprises sharper turns than the continuous change in curvature path, and the one or more local paths of one of the roadmap graphs comprises the modified-Dubins path.

10. The system as claimed in claim 4 wherein the determined joining path of one of the plurality of automated vehicles does not intersect with the start position and the goal position of one or more of the roadmap graphs for another automated vehicle of the plurality of automated vehicles.

11. The system as claimed in claim 4 wherein the coordinated path plan requires one of the plurality of automated vehicles to wait until another of the plurality of automated vehicles passes a specific location.

12. The system as claimed in claim 4 wherein the one or more central processing units execute instructions to remove at least a portion of the roadmap graphs from the solution set of roadmap graphs based at least in part upon a heuristic of each removed portion of the roadmap graphs.

13. The system as claimed in claim 12 wherein the heuristic is indicative of travel time.

14. The system as claimed in claim 12 wherein the heuristic is indicative of cost associated with start-up of an idled vehicle of the plurality of automated vehicles.

15. The system as claimed in claim 12 wherein the heuristic is indicative of the high-level nodes, the connection nodes, and roadmap nodes that are unavailable.

16. The system as claimed in claim 4 wherein the one or more central processing units execute instructions to identify respective connection nodes, roadmap nodes, or local paths which correspond to the start position, the goal position, or both, if the start position, the goal position, or both are within the multivehicle warehouse and on the multi-level graph.

17. The system as claimed in claim 1 wherein the plurality of automated vehicles are non-holonomic.

18. The system as claimed in claim 1 wherein the floor portion of the multivehicle warehouse comprises a floor area of a floor, the floor area comprising: one or more ramp portions, at least two levels comprising different elevations, or both.

19. A system for coordinated path planning in a multivehicle warehouse environment, the system comprising a plurality of automated vehicles for moving a product around the multivehicle warehouse and one or more central processing units, wherein:
each automated vehicle comprises a memory comprising a navigation module; and
the one or more central processing units are communicatively coupled to the plurality of automated vehicles and execute instructions to:

receive executable tasks in the multivehicle warehouse for one or more of the plurality of automated vehicles, select a coordinated path plan for a number of the plurality of automated vehicles for which executable tasks have been received, wherein the coordinated path plan is selected with the one or more central processing units from a solution set of roadmap graphs from a multi-level graph, the multi-level graph comprising a plurality of graph levels with respect to a floor portion of the multivehicle warehouse, the plurality of graph levels comprising at least a higher level graph of the floor portion and a lower level graph of the floor portion, the higher level graph comprising a plurality of high-level nodes, the lower level graph comprising a plurality of lower-level nodes, each lower-level node disposed in a position within or on a boundary of a respective high-level node of the plurality of high-level nodes, each lower-level node comprising a smaller surface area than the respective high-level node with respect to the floor portion, and the solution set of roadmap graphs comprising one or more unique combinations of lower-level nodes and high-level nodes and path segments connection various ones of the lower-level nodes and the high-level nodes, construct, with the one or more central processing units, a grid associated with the multivehicle warehouse, wherein the grid demarcates a plurality of grid squares, and respective grid squares contain a portion of the multivehicle warehouse and a portion of the corresponding multi-level graph;

select from the plurality of grid squares, with the one or more central processing units, grid squares corresponding to a start position, a goal position, or both, if the start position, the goal position, or both, are within the multivehicle warehouse but off the multi-level graph;

determine within one or more of the selected grid squares, with the one or more central processing units, joining paths from the start position, the goal position, or both, to the multi-level graph, wherein each of the roadmap graphs comprises the start position linked via a final path to the goal position, the final path comprises a determined joining path and at least a portion of the local paths, and the coordinated path plan for the automated vehicles is selected from the solution set of roadmap graphs;

communicate at least a portion of the coordinated path plan to the number of the plurality of automated vehicles for which executable tasks have been received such that respective navigation modules of the number of the plurality of automated vehicles navigate a respective automated vehicle, according to the received portion of the coordinated path plan, receive up-coming executable tasks in the multivehicle warehouse for one or more of the plurality of automated vehicles, use the up-coming executable tasks to forecast a revised coordinated path plan for the number of the plurality of automated vehicles operating according to the received portion of the coordinated path plan, and communicate at least a portion of the revised coordinated path plan to the number of the plurality of automated vehicles for which up-coming executable tasks have been received such that, upon receipt of instructions to execute up-coming executable tasks, respective navigation modules of the number of the plurality of automated vehicles navigate the respective automated vehicle, according to the received portion of the revised coordinated path plan.

* * * * *

UNITED STATES PATENT AND TRADEMARK OFFICE
CERTIFICATE OF CORRECTION

PATENT NO. : 9,958,873 B2
APPLICATION NO. : 14/881511
DATED : May 1, 2018
INVENTOR(S) : Jacob Jay Thomson Page 1 of 1

It is certified that error appears in the above-identified patent and that said Letters Patent is hereby corrected as shown below:

In the Claims

Column 10, Line 52, Claim 1:
"segments connection various ones of the lower-level"
Should read:
--segments connecting various ones of the lower-level--; and Column 11, Line 62, Claim 5:
"a part of the region corresponding the blocked nodes."
Should read:
--a part of the region corresponding to the blocked nodes.--; and Column 13, Line 23, Claim 19:
"segments connection various ones of the lower-level"
Should read:
--segments connecting various ones of the lower-level--.

Signed and Sealed this
First Day of January, 2019

Andrei Iancu
*Director of the United States Patent and Trademark Office*